(12) United States Patent
Anderson et al.

(10) Patent No.: US 8,116,067 B2
(45) Date of Patent: Feb. 14, 2012

(54) NANOPOROUS INSULATING OXIDE ELECTROLYTE MEMBRANE ULTRACAPACITOR, BUTTON CELL, STACKED CELL AND COILED CELL AND METHODS OF MANUFACTURE AND USE THEREOF

(75) Inventors: Marc A. Anderson, Madison, WI (US); Kevin C. Leonard, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 955 days.

(21) Appl. No.: 11/932,519

(22) Filed: Oct. 31, 2007

(65) Prior Publication Data
US 2009/0154060 A1 Jun. 18, 2009

Related U.S. Application Data

(60) Provisional application No. 60/855,768, filed on Oct. 31, 2006.

(51) Int. Cl.
*H01G 9/00* (2006.01)

(52) U.S. Cl. ........ 361/502; 361/504; 361/516; 361/517; 361/519; 361/523

(58) Field of Classification Search .................. 361/523, 361/525–528, 509–512, 516–519
See application file for complete search history.

(56) References Cited

U.S. PATENT DOCUMENTS

| | | | |
|---|---|---|---|
| 5,006,248 A | 4/1991 | Anderson et al. | |
| 5,208,190 A | 5/1993 | Anderson et al. | |
| 5,402,306 A * | 3/1995 | Mayer et al. | 361/502 |
| 5,581,438 A * | 12/1996 | Halliop | 361/502 |
| 6,064,562 A | 5/2000 | Okamura et al. | |
| 6,205,016 B1 * | 3/2001 | Niu | 361/503 |
| 7,057,881 B2 * | 6/2006 | Chow et al. | 361/508 |
| 7,141,081 B2 * | 11/2006 | Sakai et al. | 29/25.03 |
| 7,279,117 B2 * | 10/2007 | Komatsu et al. | 252/62.2 |
| 7,449,235 B2 * | 11/2008 | Sawaki et al. | 428/402 |
| 7,724,501 B2 * | 5/2010 | Ozawa et al. | 361/523 |

(Continued)

FOREIGN PATENT DOCUMENTS

| | | |
|---|---|---|
| EP | 1 555 244 A2 | 7/2005 |
| JP | 2002190426 | 7/2002 |
| JP | 2003243264 | 8/2003 |

OTHER PUBLICATIONS

Chu, L., et al., Microporous Silica Gels From Alkylsilicate-Water Two Phase Hydrolysis, Mat. Res. Soc. Symp. Proc. 346:855-860 (1994).

(Continued)

*Primary Examiner* — Nguyen T Ha
(74) *Attorney, Agent, or Firm* — Armstrong Teasdale LLP

(57) ABSTRACT

A nanoporous insulating oxide composite electrode and ultracapacitor device, method of manufacture and method of use thereof. The composite electrode being constructed from a conductive backing electrode and an composite layer. Preferably, the ultracapacitor device is configured in a stacked, coiled or button cell configurations and includes composite electrodes. The composite layer being substantially free of mixed oxidation states and nanoporous and having a median pore diameter of 0.5-500 nanometers and average surface area of 300-600 m$^2$/g. The composite layer made from a stable sol-gel suspension containing particles of the insulating oxide, the median primary particle diameter being 1-50 nanometers. Preferably, the insulating oxide is $Al_2O_3$, $MgAl_2O_4$, $SiO_2$ or $TiO_2$. Preferably, the backing electrode is carbon paper sputter-coated with a film of Au.

47 Claims, 10 Drawing Sheets

U.S. PATENT DOCUMENTS

2002/0136887 A1     9/2002   Penneau et al.
2003/0218857 A1*   11/2003   Omori et al. .................. 361/501
2004/0104450 A1*   6/2004   Arai et al. ..................... 257/532

OTHER PUBLICATIONS

Conway, B.E., "Electrochemical Supercapacitors; Scientific Fundamentals and Technological App.," Kluwer Academic/Plenum Publishers, NY p. 221-227 (1999).

Jang, J.H., et al., "Supercapacitor Performance of Hydrous Ruthenium Oxide Electrodes Prepared . . . ," J. Electrochemical Soc. 153:A321-A328 (2006).

Kotz, R., et al., "Principles and applications of electrochemical capacitors," Electrochimica Acta 45:2483-2498 (2000).

Liu, K-C., et al., "Porous Nickel Oxide/Nickel Films for Electrochemical Capacitors," J. Electrochem. Soc. 143:124-130 (1996).

Pang, S-C., et al., "Novel Electrode Materials for Thin-Film Ultracapacitors: Comparison of Electrochemical Properties of Sol-Gel . . . ," J. Electrochem. Soc. 147:444-450 (2000).

* cited by examiner

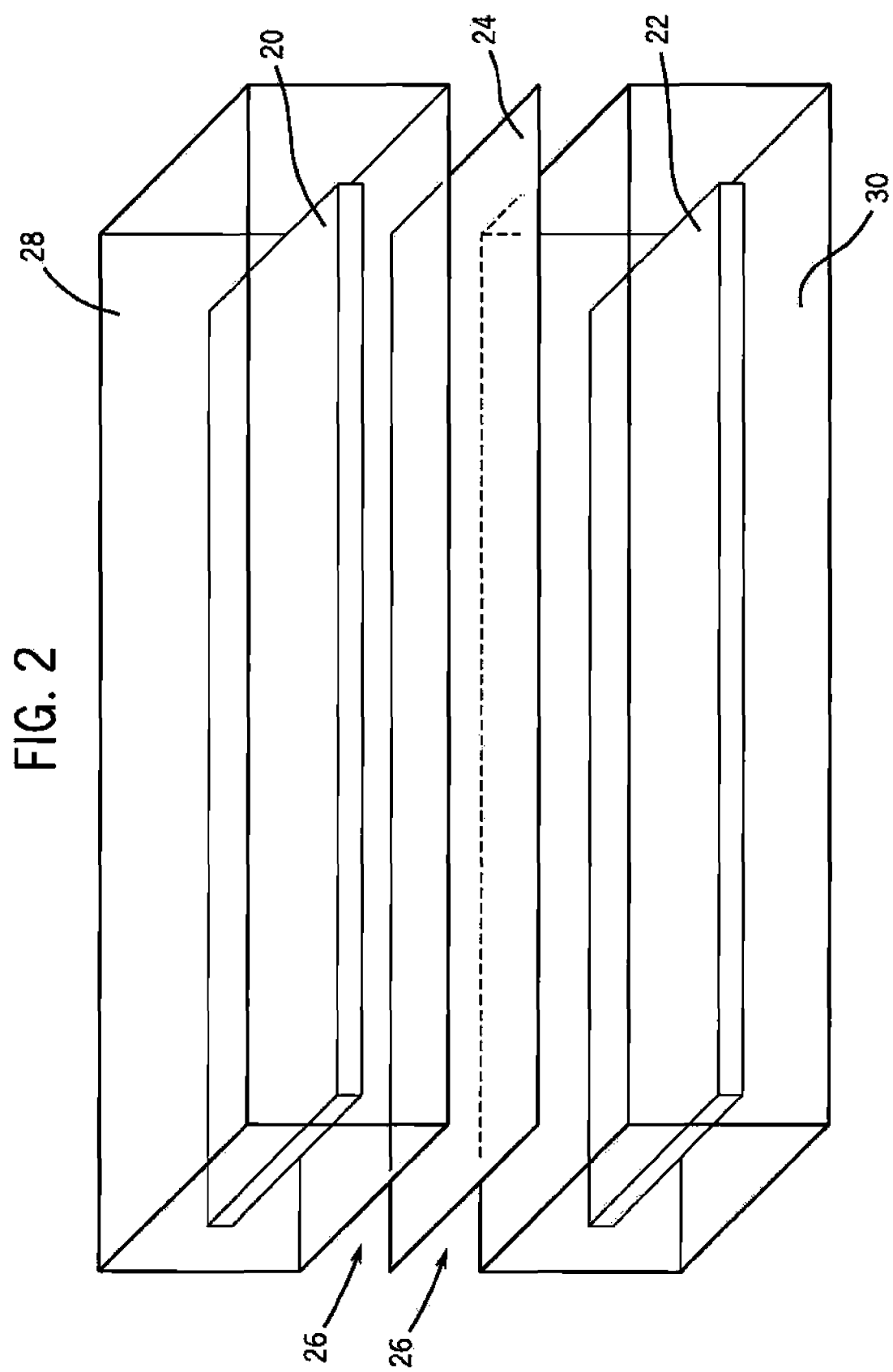

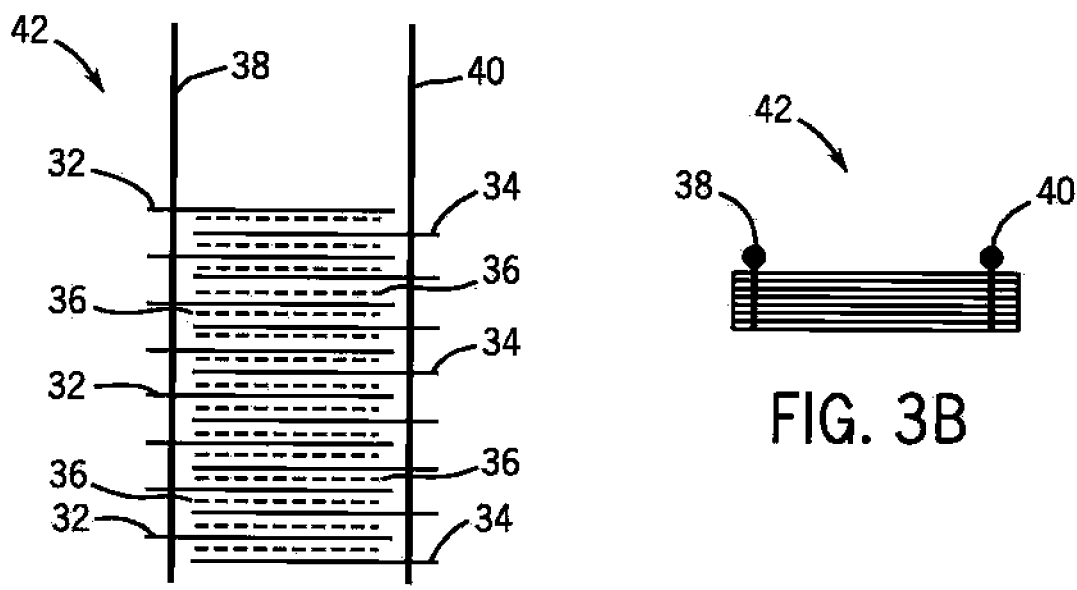
FIG. 3A
FIG. 3B
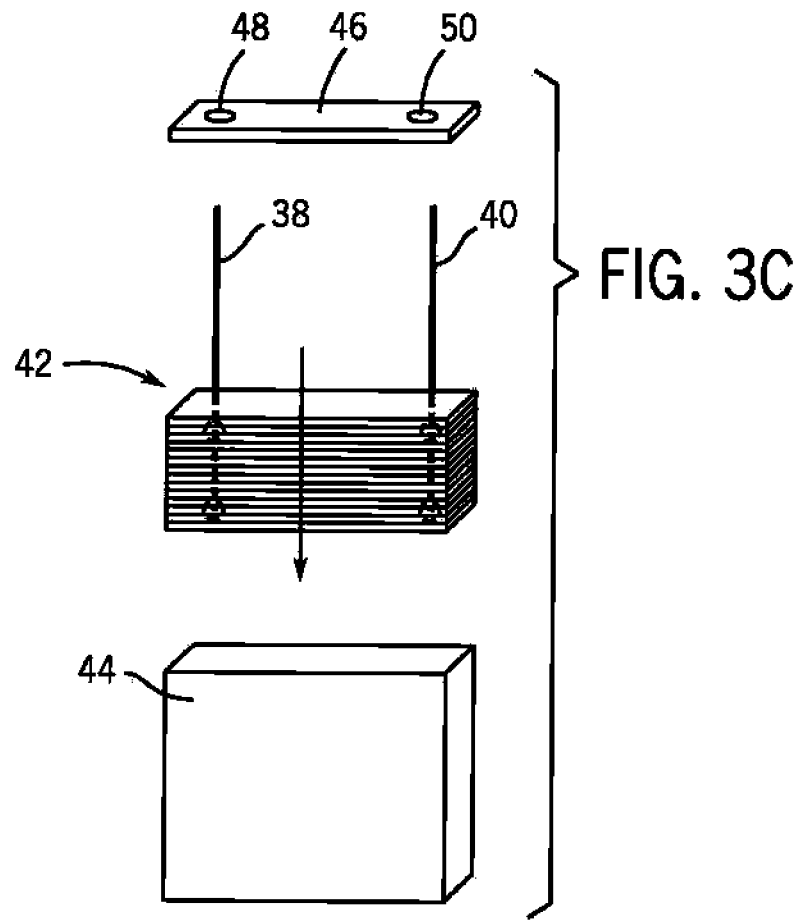
FIG. 3C

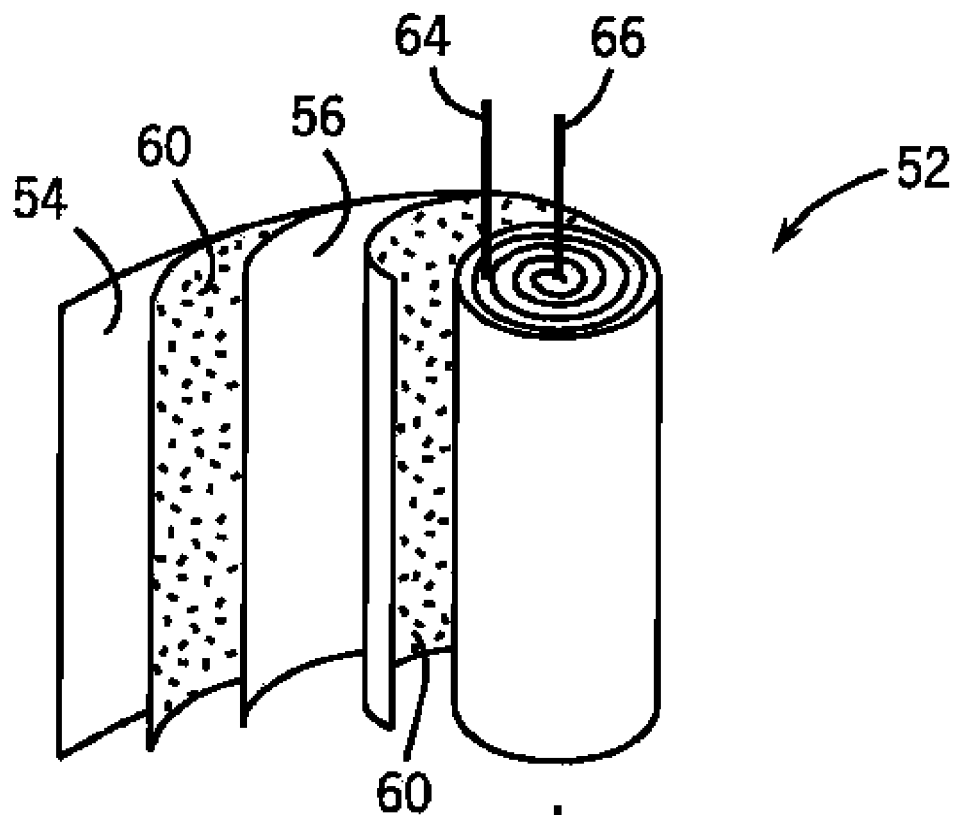
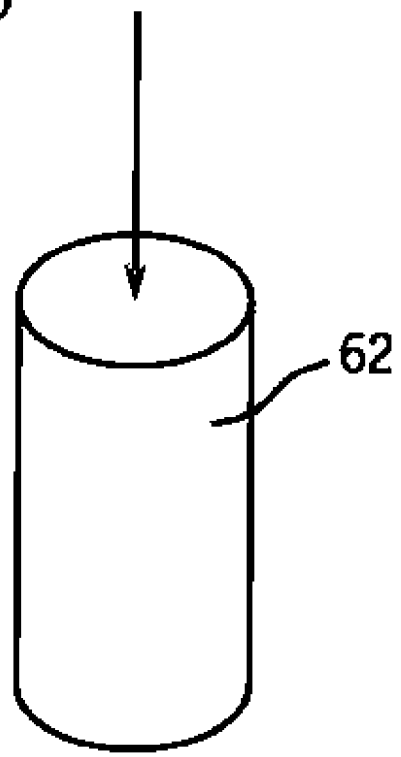
FIG. 4

NANOPOROUS INSULATING OXIDE ELECTROLYTE MEMBRANE ULTRACAPACITOR, BUTTON CELL, STACKED CELL AND COILED CELL AND METHODS OF MANUFACTURE AND USE THEREOF

CROSS REFERENCE TO RELATED APPLICATIONS

This application claims priority to and benefit of U.S. Provisional Application Ser. No. 60/855,768, filed on Oct. 31, 2006, which is hereby incorporated herein by reference in its entirety.

STATEMENT REGARDING FEDERAL FUNDING

The invention was made with United States government support by the National Oceanic and Atmospheric Administration under Grant No. NAIGRG2257 and through the SEA Grant Program. The invention was made with United States government support awarded by the following agency: NSF 0441575. The U.S. Federal Government has certain rights in the invention.

FIELD OF THE INVENTION

The invention disclosed herein relates to the field of capacitors configured in stacks or coils and button cells and methods of manufacture and use thereof.

BACKGROUND OF THE INVENTION

Many metal oxides have historically been used in the manufacture of electrochemical capacitors including, but not limited to, $RuO_2$, $MnO_2$, $V_2O_5$, $CoO$ and $NiO$. (Jang J et al., *J Electrochem Soc* 153:A321 (2006); Pang S et al., *Electrochem Soc* 147:444 (2000); and Liu et al., *J Electrochem Soc* 143:124 (1996)). Also, many of these metal oxide electrochemical capacitors undergo faradaic reactions as part of their capacitive behavior (i.e., psuedocapacitors). Such metal oxides also undergo redox reactions yielding mixed oxidation states, which is undesirable. In many instances, metal oxides are also more costly than nonmetallic oxides.

The field of ionic conductors and electron transport is discussed in Maier J, Nanoionics: ion transport and electrochemical storage in confined systems, *Nature Materials* 4:805-815 (Nov. 4, 2005).

However, there exists a long felt need for improved capacitors and ultracapacitors having more power density, particularly at high frequencies. There also exists a need for greater capacitance at higher charging/discharging frequencies. Improved energy storage (Joules/volume) is also needed.

SUMMARY OF THE INVENTION

One aspect of the invention is a composite electrode for use in a capacitor comprising a conductive member, and, a composite member constructed from insulating oxide particles and having a median pore diameter in the range of 0.1-500 nanometers.

In an exemplary embodiment of the composite electrode, the composite member is substantially free of mixed oxidation states of the oxide. By "substantially free of mixed oxidation states" it is meant that the amount present has no material adverse effect on the insulating property of the composite electrode. The composite members of the instant invention may also be referred to as being "microporous," particularly at the larger end of the median pore diameter range (i.e., closer to 500 nanometers). Due to the small diameter of such particles, it is possible that they would appear amorphous under X-Ray diffraction.

In another exemplary embodiment of the composite electrode, the median pore diameter is in the range of 0.3-25 nanometers.

In another exemplary embodiment of the composite electrode, the median pore diameter is in the range of 0.3-5 nanometers.

In another exemplary embodiment of the composite electrode, the composite member is a layer having an average thickness in the range of 0.01 to 50 μm.

In another exemplary embodiment of the composite electrode, the composite member is a layer having an average thickness in the range of 0.1 to 10 μm.

In another exemplary embodiment of the composite electrode, the composite member is made from a stable sol-gel suspension comprising insulating oxide particles having a median primary particle diameter in the range of 0.5-500 nanometers, and the insulating atom is Be, Mg, Ca, Sr, Ba, Ra, Ti, Zr, Hf, Zn, Cd, Hg, B, Al, Ga, In, Tl, C, Si, Ge, Sn, Pb or combinations thereof.

In another exemplary embodiment of the composite electrode, the insulating oxide is an alkaline substituted aluminum oxide or an alkaline earth substituted aluminum oxide.

In another exemplary embodiment of the composite electrode, the insulating oxide is $Al_2O_3$, $MgAl_2O_4$, $SiO_2$, $TiO_2$, $ZnO$, $ZrO_2$ or mixtures thereof.

In another exemplary embodiment of the composite electrode, the composite member has average surface area in the range of 300-600 $m^2/g$.

In another exemplary embodiment of the composite electrode, the conductive member is constructed from carbon, and the surface area of the conductive member is in the range of 1-2000 $m^2/g$.

In another exemplary embodiment of the composite electrode, the conductive member is constructed from carbon, and the surface area of the conductive member is in the range of 30-400 $m^2/g$.

In another exemplary embodiment of the composite electrode, the insulating oxide is a mixture of $MgAl_2O_4$ and $Al_2O_3$ at a molar ratio in the range of (0.01-1):1 $MgAl_2O_4$:$Al_2O_3$, the median primary particle diameter of the $MgAl_2O_4$ is in the range of 1-50 nanometers, and the median primary particle diameter of the $Al_2O_3$ is in the range of 1-50 nanometers.

In another exemplary embodiment of the composite electrode, the median primary particle diameter of $MgAl_2O_4$ is in the range of 1-20 nanometers, and the median primary particle diameter of the $Al_2O_3$ is 1-20 nanometers.

In another exemplary embodiment of the composite electrode, the insulating oxide mixture has a molar ratio in the range of (0.4-1):1 $MgAl_2O_4$:$Al_2O_3$.

In another exemplary embodiment of the composite electrode, the insulating oxide mixture has a molar ratio in the range of (0.4-1):1 $MgAl_2O_4$:$Al_2O_3$.

In another exemplary embodiment of the composite electrode, the insulating oxide is $TiO_2$, and the median primary particle diameter is in the range of 1-50 nanometers.

In another exemplary embodiment of the composite electrode, the insulating oxide is $TiO_2$, and the median primary particle diameter is in the range of 1-20 nanometers.

In another exemplary embodiment of the composite electrode, the insulating oxide is $SiO_2$, and the median primary particle diameter is in the range of 1-50 nanometers.

In another exemplary embodiment of the composite electrode, the insulating oxide is $SiO_2$, and the median primary particle diameter is in the range of 1 to 8 nanometers.

In another exemplary embodiment of the composite electrode, the conductive member is porous or nonporous.

In another exemplary embodiment of the composite electrode, the conductive member is carbon paper coated with a Au film.

In another exemplary embodiment of the composite electrode, the conductive member is metal-coated carbon, conducting polymer, metal, conducting carbon, or combinations thereof.

In another exemplary embodiment of the composite electrode, the conductive member comprises nickel or stainless steel.

In another exemplary embodiment of the composite electrode, the composite member is at least 95% free of mixed oxidation states of the oxide.

In another exemplary embodiment of the composite electrode, the composite member contains no more than a trace amount of mixed oxidation states of the oxide.

Another aspect of the invention is a capacitor (also referred to as an ultracapacitor) comprising a first composite electrode comprising any one of the instant composite electrodes set forth herein, a second electrode, an electrolyte-containing solution disposed between the first composite electrode and the second electrode, a porous member disposed between the first composite electrode and the second electrode, and, a casing enclosing the first composite electrode, the second electrode, the porous member, and the electrolyte-containing solution.

In an exemplary embodiment of the capacitor, the second electrode is independently any one of the instant composite electrodes set forth herein.

In another exemplary embodiment of the capacitor, the casing is constructed from nickel, titanium, aluminum, stainless steel or polymer, and wherein the capacitor is a button cell.

In another exemplary embodiment of the capacitor, the first and second insulating oxides are $SiO_2$.

In another exemplary embodiment of the capacitor, the electrolyte-containing solution is an aqueous solution (such as any suitable acid, base or salt electrolyte-forming substance) comprising electrolytes resulting from the following compounds: $H_3PO_4$, $KCl$, $NaClO_4$, $NaCl$, $LiCl$, $LiNO_3$, $KNO_3$, $NaNO_3$, $NaOH$, $KOH$, $LiOH$, $NH_4OH$, $NH_4Cl$, $NH_4NO_3$, $LiClO_4$, $CaCl_2$, $MgCl_2$, $HCl$, $HNO_3$, $H_2SO_4$, $KClO_4$, $Na_3PO_4$, $Na_2HPO_4$, and/or $NaH_2PO_4$.

In another exemplary embodiment of the aqueous capacitor, the capacitor is adapted to operate at frequency in the range of 0.01 Hz up to 1000 Hz. For most predetermined designs, the aqueous-based capacitor is generally capable of higher frequencies than a similarly-designed organic-based capacitor.

In another exemplary embodiment of the capacitor, the organic electrolyte is a suitable organic acid, organic base or organic salt. Other ionic salts and liquid solutions thereof useful as electrolytes in the instant invention include those available from Merck KGaA and sold as Ionic Liquid Kits.

In another exemplary embodiment of the capacitor, the electrolyte-containing solution is an organic solution comprising electrolytes resulting from the following compounds: tetraethyl ammonium tetrafluoroborate in propylene carbonate, tetraethyl ammonium tetrafluoroborate in acetonitrile, $LiBF_6$, $LiPF_6$, 1-hexyl-3-methylimidazolium FAP, 1-hexyl-3-methylimidazolium imide, 1-butyl-1-methylpyrrolidinium FAP, 1-butyl-1-methylpyrrolidinium imide, 1-butyl-3-methylimidazolium $PF_6$, butyl-methylpyrrolidinium triflate, 1-butyl-1-methylpyrrolidinium FAP, ethyl-dimethylpropylammonium imide, trihexyl(tetradecyl)phosphonium FAP 1-butyl-1-methylpyrrolidinium BOB, trihexyl(tetradecyl) phosphonium FAP 1-butyl-1-methylpyrrolidinium triflate, 1-hexyl-3-methylimidazolium imide 1-butyl-1-methylpyrrolidinium imide, 1-hexyl-3-methylimidazolium FAP, methyltrioctylammonium trifluoroacetate, N-butyl-4-methylpyridinium $BF_4$, 1-butyl-3-methylimidazolium $BF_4$, 1-butyl-3-methylimidazolium $PF_6$, 1-butyl-3-methylimidazolium triflate, trioctylmethylammonium triflate, 1-butyl-1-methylpyrrolidinium imide, 1-hexyl-3-methylimidazolium FAP, 1-butyl-3-methylimidazolium $BF_4$, 1-butyl-3-methylimidazolium PF6, 1-ethyl-3-methylimidazolium thiocyanate, 1propyl-3-methylimidazolium iodide, 1-butyl-2,3-dimethylimidazolium iodide, 1,1-dimethylpyrrolidinium iodide, 1,2,3-trimethylimidazolium iodide, 1-butyl-3-methylimidazolium $BF_4$, 1-butyl-3-methylimidazolium $PF_6$, 1-butyl-3-methylimidazolium triflate, 1-butyl-1-methylpyrrolidinium imide, 1-hexyl-3-methylimidazolium FAP, 1-butyl-1-methylpyrrolidinium imide, trihexyl(tetradecyl)phosphonium FAP, trihexyl(tetradecyl)phosphonium BOB, N"-ethyl-N,N,N',N'-tetramethylguanidinium FAP, 1-hexyl-3-methyl imidazolium imide, 1-ethyl-3-methylimidazolium triflate, emim bis(pentafluoroethyl)phosphinate, 1-butyl-3-methylimidazolium methylsulfate, 1-ethyl-3-methylimidazolium $BF_4$, N-butyl-4-methylpyridinium $BF_4$, and combinations thereof.

In another exemplary embodiment of the organic capacitor, the capacitor adapted to operate at frequency in the range of 0 Hz up to 1 Hz.

In another exemplary embodiment of the capacitor, the porous member is a layer comprising conducting polymer.

Another aspect of the invention is a method of using any one of the instant composite electrodes set forth herein comprising the acts or steps of providing an opposing electrode, disposing an electrolyte-containing solution and porous member between the composite electrode and the opposing electrode, and, generating an electrical potential between the electrodes.

Another aspect of the invention is a method of using any one of the instant capacitors set forth herein comprising the act or step of creating an electrical potential between the electrodes.

Another aspect of the invention is a method of making any one of the instant composite electrodes set forth herein comprising the acts or steps of providing a wettable conductive member, providing a stable sol-gel suspension comprising insulating oxide having a median primary particle diameter in a range being 0.5-500 nm, 1-50 nm, 1-20 nm, or 1-8 nm, contacting the stable sol-gel suspension to the wettable conductive member, and, curing the sol-gel suspension producing a sol-gel member.

In an exemplary embodiment of the method of making any one of the instant composite electrodes, the method further comprises the acts or steps of heating the conductive member at a predetermined temperature and for a predetermined duration producing a conductive member wettable to the sol-gel suspension, and, sintering the sol-gel and wettable conductive members at a predetermined sintering temperature and for a predetermined sintering duration producing the composite member adhered to the surface of the conducting member.

In an exemplary embodiment of the method of making any one of the instant composite electrodes, the method comprises a plurality of contacting steps and a plurality of sintering steps.

In an exemplary embodiment of the method of making any one of the instant composite electrodes, the insulating oxide is SiO$_2$, the predetermined sintering temperature is 300° C. to 400° C., and the predetermined sintering duration is 3 hours.

In an exemplary embodiment of the method of making any one of the instant composite electrodes, the insulating oxide is a mixture of MgAl$_2$O$_4$ and Al$_2$O$_3$ at a molar ratio in the range of (0.01-1):1 MgAl$_2$O$_4$:Al$_2$O$_3$, the predetermined sintering temperature is 400° C., and the predetermined sintering duration is 6 hours.

In an exemplary embodiment of the method of making any one of the instant composite electrodes, the molar ratio is in the range of (0.4-1):1 MgAl$_2$O$_4$:Al$_2$O$_3$.

In an exemplary embodiment of the method of making any one of the instant composite electrodes, the stable sol-gel suspension is contacted with the wettable conductive member by a process including chemical vapor deposition, sputtering, plasma spray, spray coating, spin coating, dip coating, slip casting, imbibing or electrodeposition.

In an exemplary embodiment of the method of making any one of the instant composite electrodes, the stable sol-gel suspension is contacted with the wettable conductive member by dip coating.

Another aspect of the invention is a stacked cell comprising a plurality of stacked alternating symmetrical composite electrodes each being any one of the instant composite electrodes set forth herein, first and second lead wires connected to respective alternating composite electrodes defining a plurality of composite negative electrodes and composite positive electrodes, a plurality of porous members each disposed between respective alternating composite negative electrodes and composite positive electrodes, electrolyte-containing solution disposed between respective alternating composite electrodes, and, an enclosure adapted to enclose and seal the alternating composite electrodes, a portion of the first and second lead wires, the porous separators and the electrolyte-containing solution.

Another aspect of the invention is a method of using any one of the instant stacked cells set forth herein comprising the act or step of generating an electrical potential across the first and second lead wires.

Another aspect of the invention is a coiled cell comprising a plurality of coiled alternating symmetrical composite electrodes each being any one of the instant composite electrodes set forth herein, first and second lead wires connected to respective alternating composite electrodes defining a plurality of composite negative electrodes and composite positive electrodes, a plurality of coiled porous separators each disposed between respective alternating composite negative electrodes and composite positive electrodes, electrolyte-containing solution disposed between respective alternating composite electrodes, and, a cylindrical enclosure adapted to enclose and seal the alternating composite electrodes, a portion of the first and second lead wires, the porous separators and the electrolyte-containing solution.

Another aspect of the invention is a method of using any one of the instant coiled cells set forth herein comprising the step or act of generating an electrical potential across the first and second lead wires.

BRIEF DESCRIPTION OF THE DRAWINGS

FIG. 2 shows a configuration of the button cell capacitor of the instant invention including symmetric opposing composite electrodes each constructed from the conductive carbon base/backing electrode and a nanoporous insulating SiO$_2$ layer, a porous insulating separator, an electrolyte-containing solution, and a Ni casing enclosure.

FIGS. 3A, 3B and 3C show a stacked cell configuration and assembly thereof, whereby multiple nanoporous SiO$_2$ coated electrodes are stacked in a parallel arrangement with a porous insulating separator, an electrolyte-containing solution, and a casing. For organic electrolyte containing devices, the separator may be one available from Nippon Kodoshi Corporation, such as MPF, TF40, TF45 or TF48. For aqueous electrolyte containing devices, the separator may be one available from Amerace, Microproducts, L.P., such as ACE-SIL®, FLEX-SIL®, CellForce® and Polyethylene.

FIG. 4 shows a wound cell configuration having nanoporous SiO$_2$ coated electrodes, a porous insulating separator, an electrolyte-containing solution, and a casing.

FIG. 6 is a graph showing a cyclic voltammogram comparing an uncoated carbon electrode having a gold (Au) sputter-coated film to improve conductivity manufactured by Marketech International, Inc. to the Au-coated carbon paper further coated with SiO$_2$ nanoparticles in a two-electrode symmetric system containing a 1M KCl electrolyte at a scan rate of 5 mV/s, whereby the capacitance of the uncoated Marketech carbon-Au electrode is 4903 F/L, whereby the capacitance of the SiO$_2$ dip-coated Au-carbon electrode is 11147 F/L, and whereby all Marketech electrodes used herein is characterized as Grade I Carbon Paper 3.5 in×10 in×0.01 in.

DETAILED DESCRIPTION OF THE EXEMPLARY EMBODIMENTS

Figure 1:
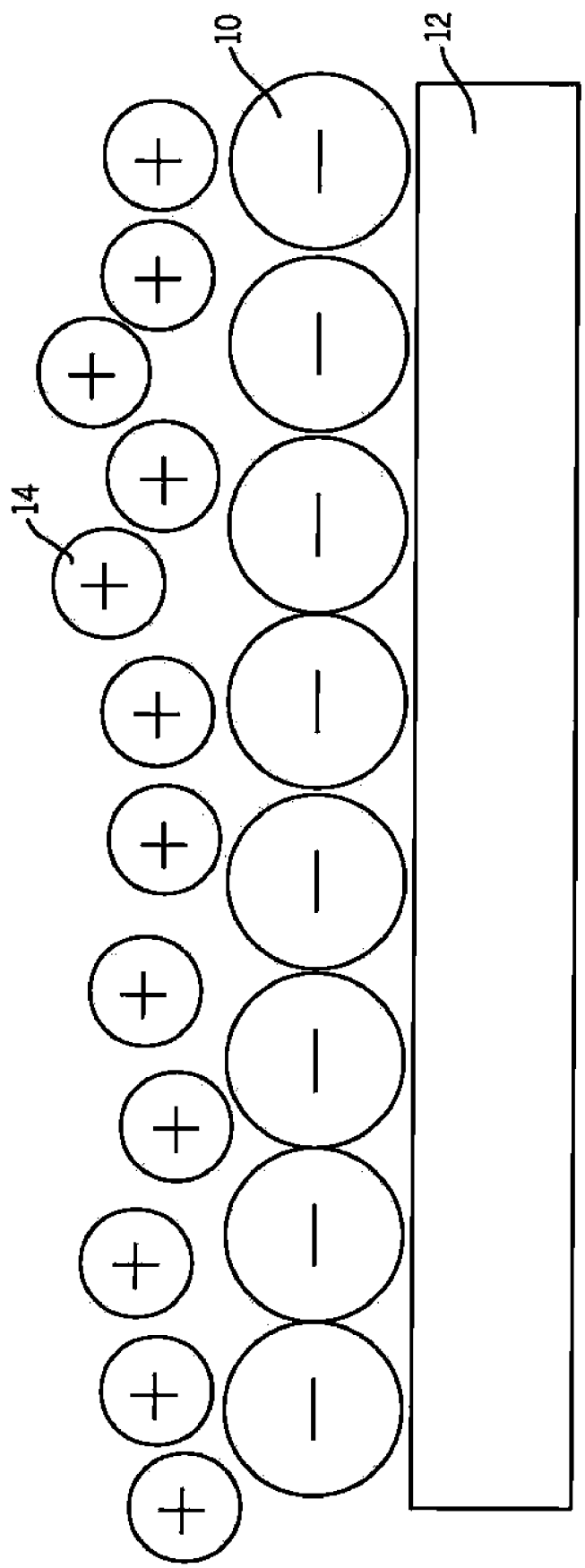
FIG. 1 shows the composite electrode of the instant invention including the conductive carbon base/backing electrode, the nanoporous insulating oxide layer being negatively charged, and electrolyte cations held against the negatively-charged surface. The conductive carbon may be made from a suitable carbon aerogel (or, other suitable carbons) having high surface area and good conductivity, preferably a surface area in the range of 300 to 600 m$^2$/g, and preferably a resistance of less man 0.04 Ohm-cm.

As shown in FIG. 1, the instant invention involves electrochemical capacitors using a nanoporous material 10 deposited on a porous conductive carbon backing electrode 12. The nanoporous material 10 is constructed from insulating oxide nanoparticles suspended in a stable gel solution, or sol. The negatively charged electrode shown in FIG. 1 attracts positively charged cations 14 in the electrolyte-containing solution 26 (see also FIG. 2). Under many operating conditions, the instant electrodes and capacitors have improved capacitance over conventional ultracapacitors and psuedocapacitors. The preferred resistivity of the carbon backing electrode is around 0.04 Ohm-cm.

Shown in FIG. 2 is a configuration of the instant button cell containing symmetrical opposing composite electrodes 20,22, a porous separator 24, electrolyte-containing solution 26 between the electrodes 20,22 and Ni casings 28,30, whereby casing 28 is insulated from casing 30. The composite electrodes 20,22 are constructed from the conductive carbon backing electrode and the nanoporous composite layer of $SiO_2$.

Shown in FIGS. 3A, 3B and 3C is another configuration utilizing the composite electrode of the present invention, which is referred to as stacked electrodes. As shown in FIG. 3A, the stacked electrode 42 includes a stack of alternating composite electrodes 32,34 and porous separators 36. Electrolyte-containing solution 26 is contained between the composite electrodes 32,32. Wire leads 38,40 are connected to respective composite electrodes 32,34. FIG. 3B shows a compacted view of the stacked electrode 42 having the wire leads 38,40. FIG. 3C shows the stacked electrode 42 being assembled by lowering the stacked electrode 42 into a box 44, whereby a lid 46 having holes 48,50 to accommodate the wire leads 38,40. The lid 46 is sealed to the box 44 so that the electrolyte-containing solution 26 does not leak. The box 44 must be either non-conducting or well insulated from contacting and shorting the stacked electrode 42.

Shown in FIG. 4 is another configuration utilizing the composite electrode of the present invention, which is referred to as a coiled electrode 52. The coiled electrode 52 includes alternating composite electrodes 54,56 wrapped into a coil, whereby a porous separator 60 is inserted between each alternating electrode 54,56. The coiled electrode 52 is dropped into a cylinder 62, and the cylinder 62 is filled with the electrolyte-containing solution 26. Assembly is completed by sealing the cylinder 62 with a lid (not shown), whereby the lid has two holes to accommodate the two wire leads 64,66. The cylinder 62 must be either non-conducting or well insulated from contacting and shorting the coiled electrode 52.

Figure 5:
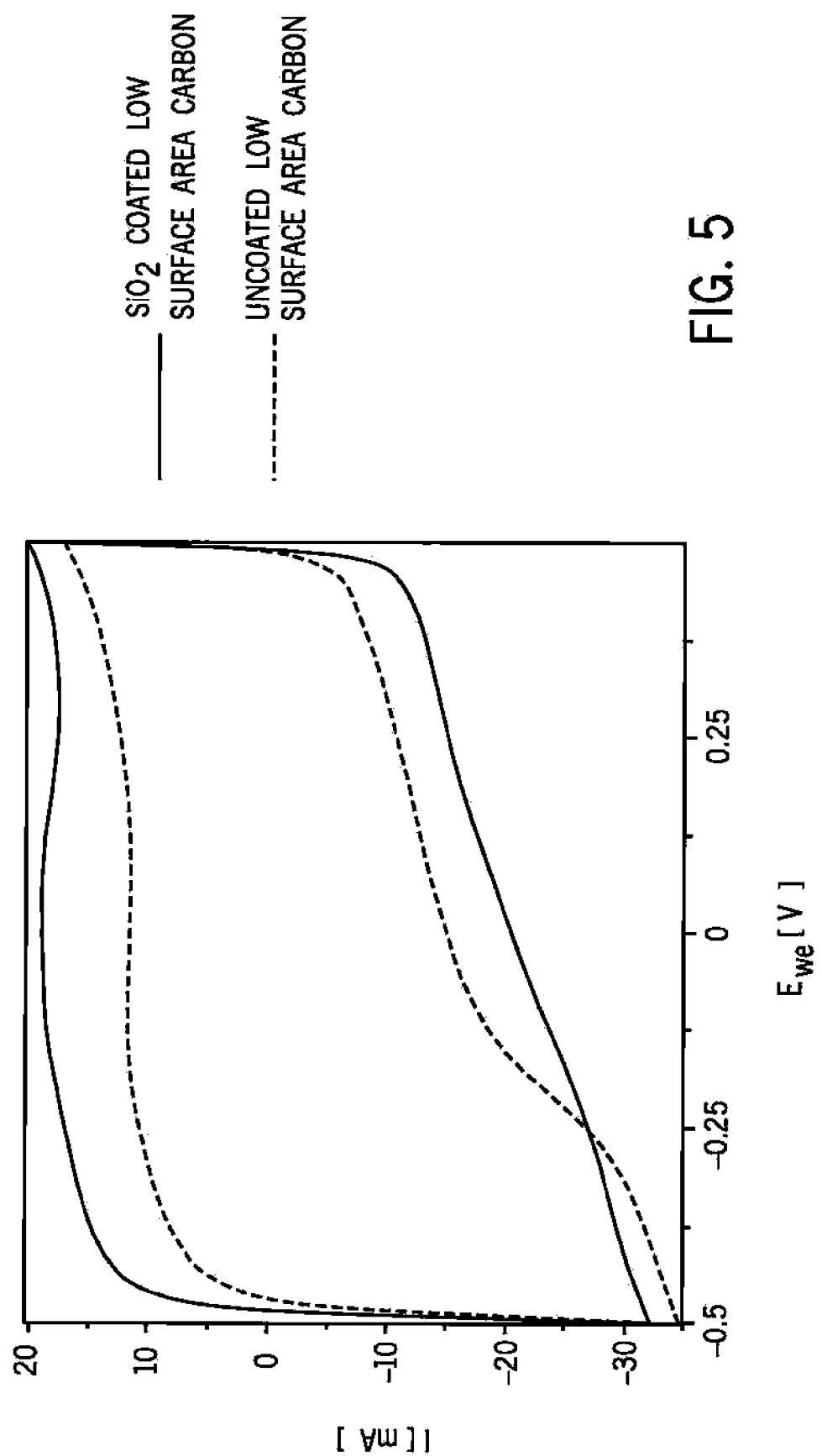
FIG. 5 is a graph showing a cyclic voltammogram comparing an uncoated porous carbon electrode containing graphite and carbon binder manufactured by Porvair Advanced Materials to the same carbon electrode coated with SiO$_2$ nanoparticles in a three-electrode system, whereby a Saturated Calomel Reference Electrode (SCE) and a Pt wire counter electrode are employed with a 1M KCl electrolyte at a scan rate of 5 mV/s, whereby the capacitance of the uncoated Porvair carbon electrode is 1069 F/L, and whereby the capacitance of the nanoporous coated composite material is 1522 F/L.
Figure 6:
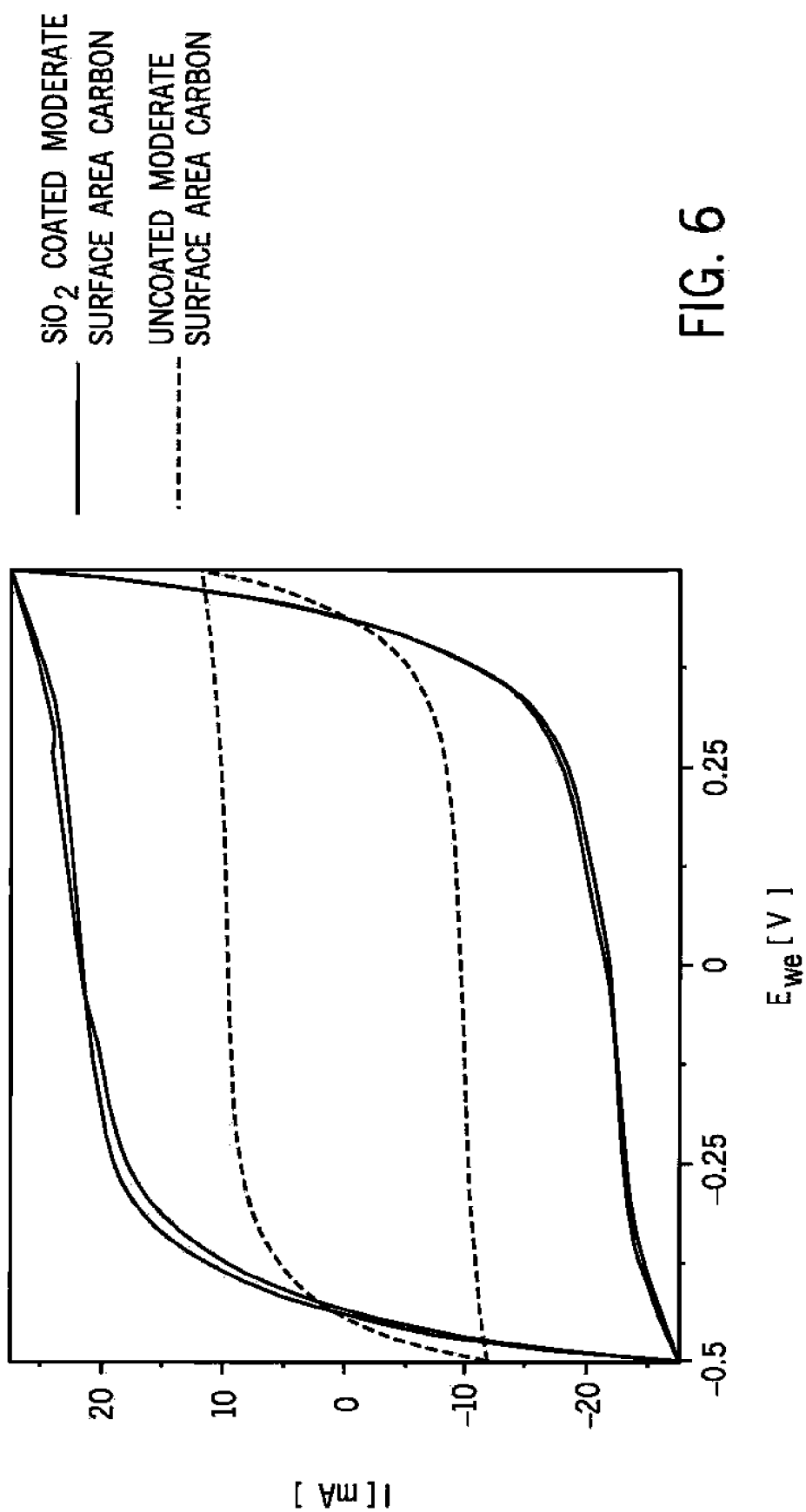
Figure 7:
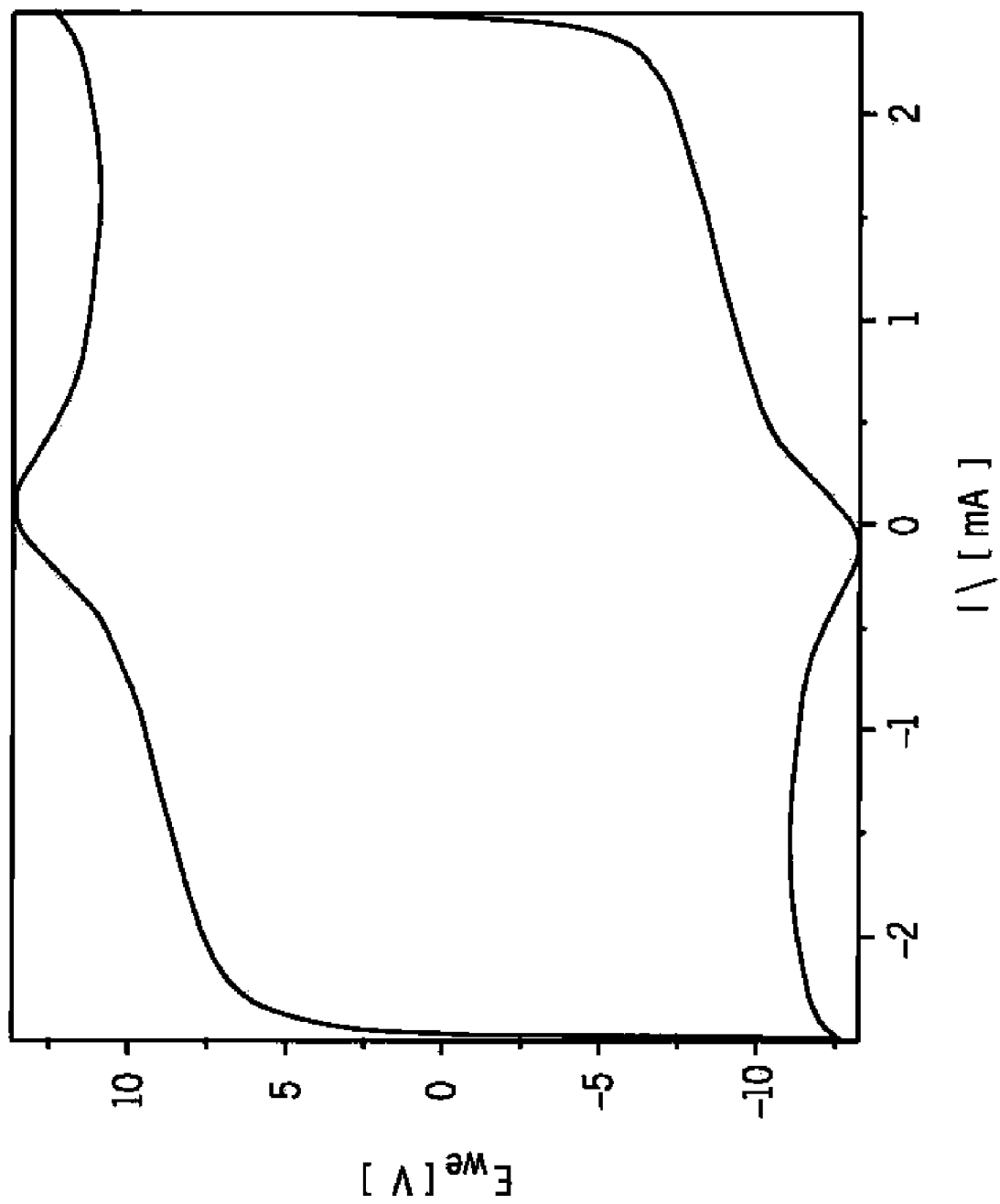
FIG. 7 is a graph showing a cyclic voltammogram of the carbon paper manufactured by Marketech International, Inc. dip coated with a layer of nanoporous SiO$_2$ in a two-electrode coin cell configuration containing an organic 1M TEABF$_4$ in acetonitrile electrolyte at a scan rate of 50 mV/s.

Capacitance was characterized and determined using cyclic voltammetry. FIG. 5 shows voltammagram data for the composite $SiO_2$ electrode as compared to an uncoated conductive carbon electrode. Capacitance was determined using the equation $C=(|I_c|+|I_a|)/2*v)$, where $I_c$ and $I_a$ are the average cathodic and average anodic currents, respectively, over the voltage range, and v is the voltage scan rate. The capacitance of the composite material was calculated to be 1522 F/L where the capacitance of the plain uncoated carbon is 1069 F/L. Importantly, the capacitance of the instant nanoporous insulating composite material did not decrease significantly as the scan rate increases from 20 mV/s to 200 mV/s.

Figure 9:
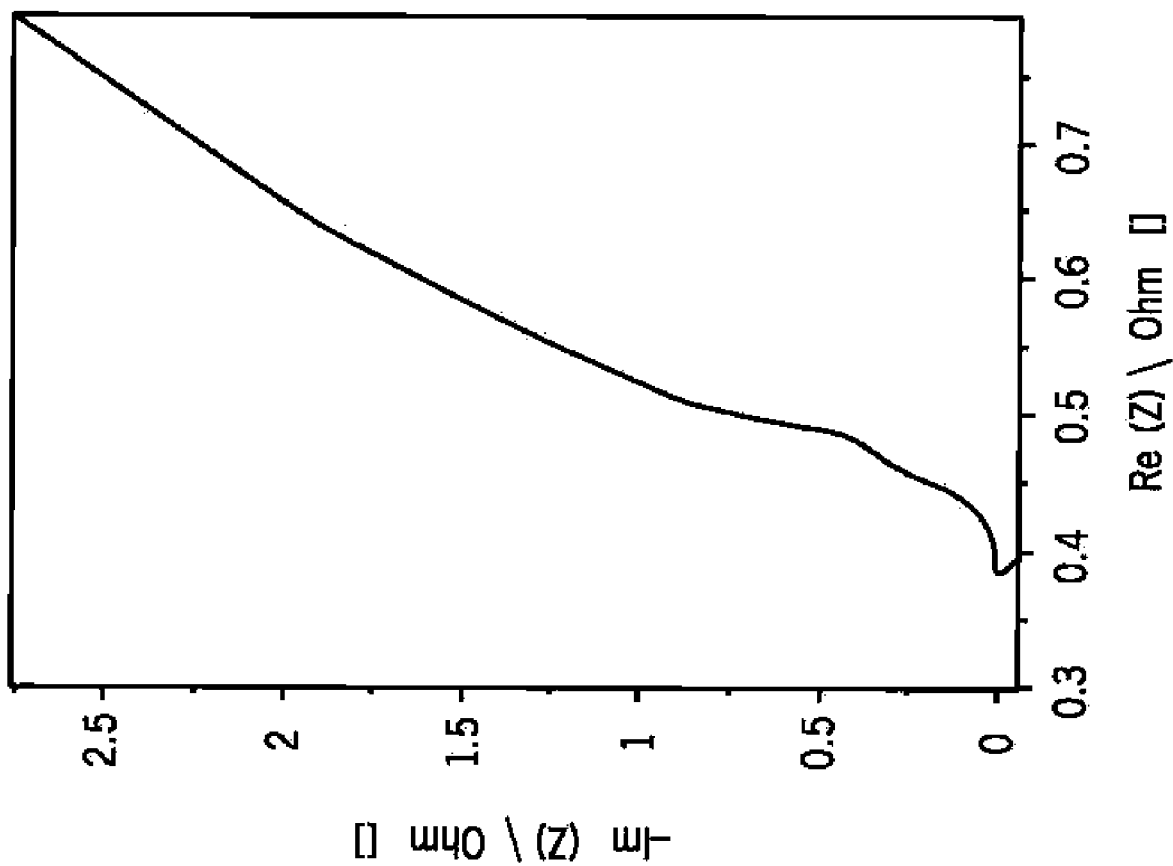
FIG. 9 is a graph showing a Nyquist plot of electrochemical impedance spectroscopy for a three-electrode configuration having a SCE reference electrode and a Pt wire counter electrode containing a 1M KCl electrolyte solution, whereby the effective series resistance is 0.36 Ohms.

The specific power and specific energy of the composite material were characterized and determined using electrochemical impedance spectroscopy. Shown in FIG. 9 is a Nyquist plot demonstrating the performance of the symmetrical $SiO_2$ button cell. The effective series resistance was calculated to be 0.36☐. The following equations were used to calculate the specific power and specific energy per unit mass: $W=\frac{1}{2}CU^2$ and $P=U^2/4R$, where W is energy, C is capacitance, U is the cell voltage, P is the power, and R is the effective series resistance. (See Kotz R et al., *Electrochim Acta* 45:2483 (2000)).

Figure 10:
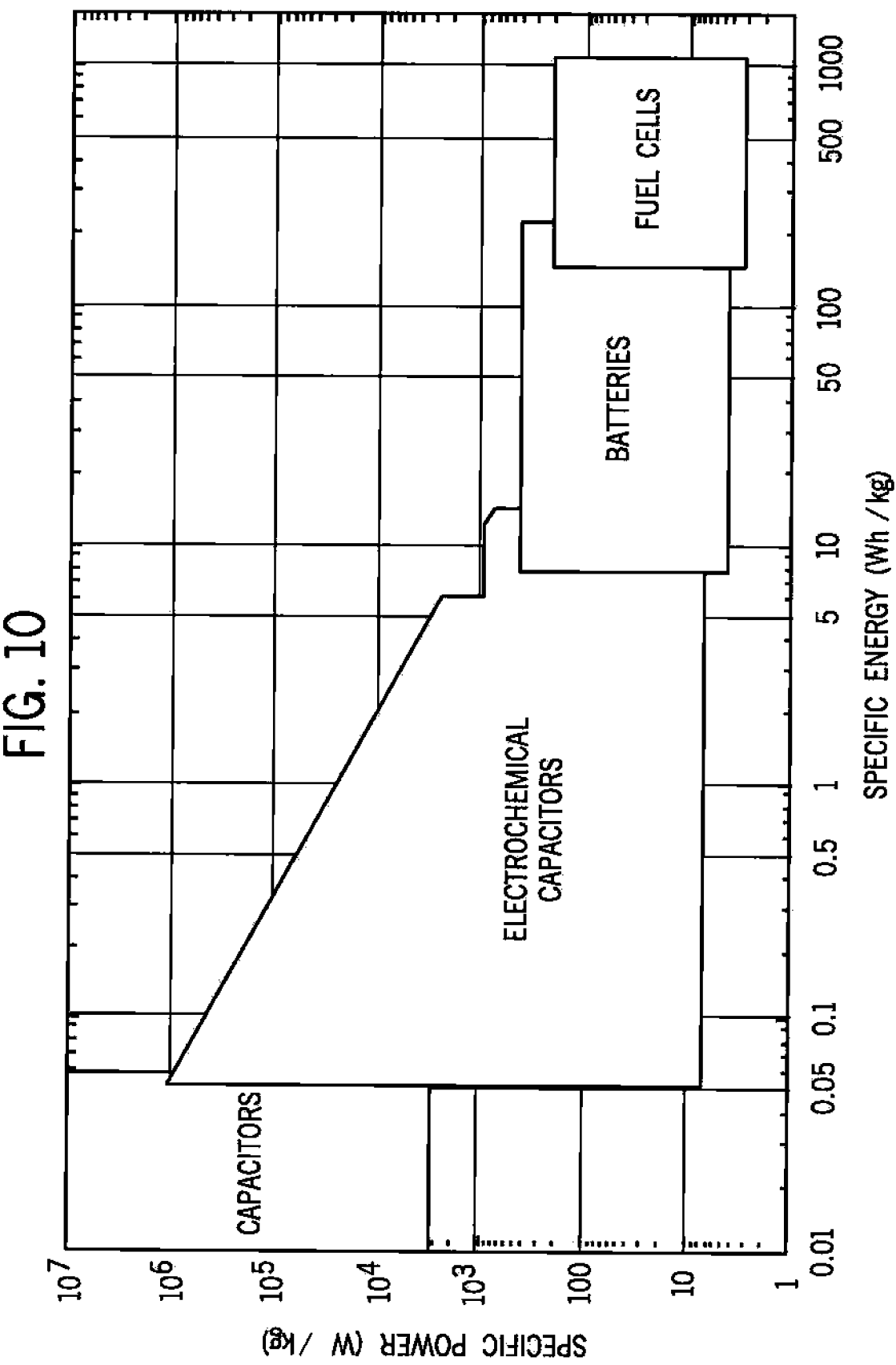
FIG. 10 is a graph showing a Ragone plot of energy and power density comparing the symmetric electrode having the SiO$_2$ nanoporous dip coated carbon paper manufactured by Marketech International, Inc. to typical known electrodes in terms of total weight of the electrode material in a 1M TEABF$_4$ in acetonitrile electrolyte, whereby the effective series resistance is 1.6 Ohms, and whereby the performance of the exemplary composite SiO$_2$ electrode is 2954 W/kg specific power and 9.9 Wh/kg specific energy with respect to the total weight of the electrode including Marketech carbon and the coating.

The specific power and energy for the instant symmetrical $SiO_2$ button cell are 2954 W/kg and 9.9 Wh/kg, with respect to the total weight of the electrode including Marketech carbon and the coating, whereby the measurement was done in 1M $TEABF_4$ in acetonitrile electrolyte. As demonstrated by the Ragone plot in FIG. 10, the instant button cell containing symmetrical nanoporous insulating $SiO_2$ electrodes is unexpectedly superior to conventional electrochemical capacitors.

Figure 8:
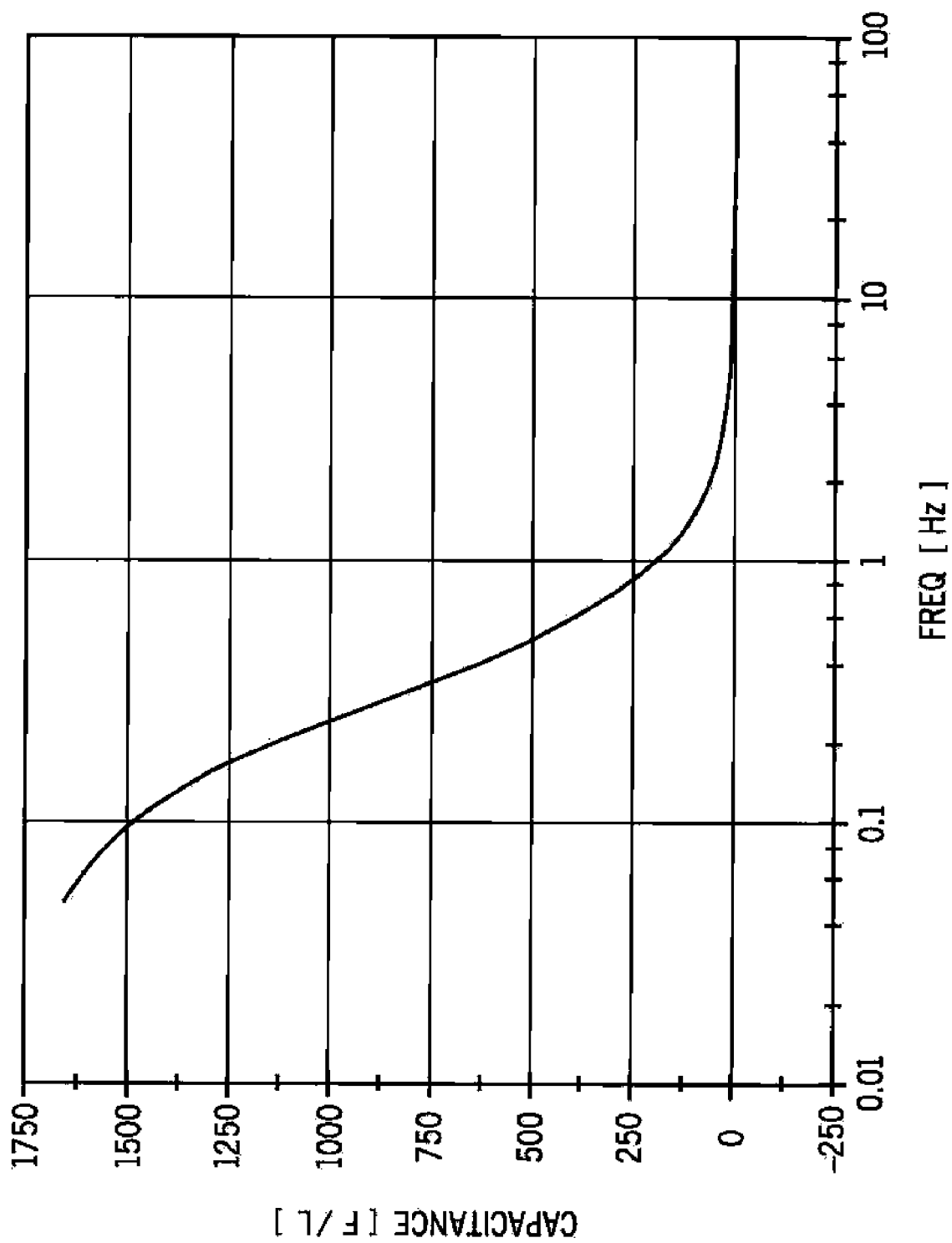
FIG. 8 is a graph showing volumetric capacitance as a function of frequency using a SiO$_2$ nanoporous coated carbon electrode manufactured by Porvair Advanced Materials in a three-electrode configuration having a SCE reference electrode and counter electrode being Pt wire in 1M KCl as determined by electrochemical impedance spectroscopy.

Electrochemical impedance spectroscopy (EIS) was also used to calculate capacitance vs frequency. (See FIG. 8). The capacitance from EIS is calculated from the equation $C=-Zim(w)/(w*|Z(w)|^2)$, where w is $2*Pi*frequency$, Zim is the imaginary part of the impedance, and $|Z|^2$ is $Zre^2+Zim^2$.

In a preferred embodiment, the invention is directed to a nanoporous insulating oxide composite electrode and ultracapacitor device, method of manufacture and method of use thereof. The composite electrode is constructed from a conductive backing electrode and an composite layer. Preferably, the ultracapacitor device is configured in a stacked, coiled or button cell configurations and includes composite electrodes. The composite layer being substantially free of mixed oxidation states and nanoporous and having a median pore diameter of 0.5-500 nanometers and average surface area of 300-600 $m^2/g$. The composite layer made from a stable sol-gel suspension containing particles of the insulating oxide, the median primary particle diameter being 1-50 nanometers. Preferably, the insulating oxide is $Al_2O_3$, $MgAl_2O_4$, $SiO_2$ or $TiO_2$. Preferably, the backing electrode is carbon paper sputter-coated with a film of Au.

EXAMPLES

The capacitor materials incorporate pioneering nanoporous insulating oxides that are imbibed/coated on a porous conductive backing electrode. In this example, the nanoporous composite layer was formed from a sol-gel suspension containing nanoparticles of $SiO_2$, which was prepared using sol-gel chemistry techniques.

Distilled and purified water was mixed with concentrated ammonium hydroxide ($NH_4OH$) and tetraethylorthosilicate (TEOS) in a volumetric ratio of 30:1:4.5. The solution/suspension was mixed for at least 1 hour, whereby the hydrolysis reaction results in suspended nanoparticles of $SiO_2$. The $SiO_2$ particles had a median primary particle diameter of approximately 2-5 nanometers. The isoelectric pH of these particles was approximately 2.0. The sol may be dialyzed to remove excess ions from solution, whereby the salts are transferred through dialysis membranes. The sol pH was adjusted to approximately 2.8.

Preparation of $SiO_2$ sol-gels are disclosed in Chu L et al., Microporous Silica Gels From Alkylsilicate-Water Two Phase Hydrolysis, *Mat. Res. Soc. Symp. Proc.* 346:855-860 (1994), which is hereby incorporated by reference.

The filtered suspension was imbibed/coated onto a porous conducting carbon electrode by dip coating. A porous (or nonporous) nickel conducting electrode may also be used. The BET surface area of the uncoated carbon electrode was approximately 1 m$^2$/g before firing. For uncoated carbon electrodes, there is likely a trade-off between surface area and conductivity. The surface area for the carbon backing electrode may be in the range of 1-2000 m$^2$/g, or 30-400 m$^2$/g.

The uncoated carbon electrode was pre-fired at 400° C. for three hours, whereby the carbon surface is rendered wettable to the sol coating. The wettable carbon surface was dip-coated with the filtered sol suspension using an ultrasonic spray coater. An air spray coater may also be used along with other processes such as electrophoretic deposition, imbibing, slip casting, spin coating, dip coating and the like. Several coats of sol were applied to the wettable carbon electrode. The suspension-coated carbon electrode was post-fired to sinter the sol particles to each other and to the conducting carbon.

Firing temperature and duration may be varied to achieve a predetermined particle diameter, pore diameter distribution and phase (particularly for MgAl$_2$O$_4$/Al$_2$O$_3$ mixture). In this example, the post-fire was conducted at 400° C. for 3 hours.

Button cell capacitors included two layers of the SiO$_2$ composite material. (See FIG. 2). The composite layers were separated by a porous nonconductive separator to prevent electrical shorting. The composite layers and separator were enclosed in a Ni casing. Other casings may be used such as casings constructed from nickel coated, stainless steel, aluminum and the like. The electrolyte-containing solution may be aqueous or organic. Electrolytes useful in the organic solution include TEABF$_4$/ACN, TEABF$_4$/PC, LiBF$_6$, LiPF$_6$ and LiClO$_4$. KCl was used in this working example.

One of the composite electrodes is the negative terminal and the other composite electrode is the positive terminal. This button cell consists of two electrochemical capacitors working in tandem. One capacitor is the positive electrode containing anions from the electrolyte in a region near the surface. The other capacitor is the negative electrode having the cations from the electrolyte in a region near the surface.

Unexpectedly, the SiO$_2$ nanoporous composite layer also does not undergo any redox reaction (referred to as psuedocapacitance) and is substantially free of mixed oxidation states. As such, the capacitor constructed from two SiO$_2$ nanoporous composite layers provided surprisingly high capacitance at high discharge frequencies.

Many conventional commercial electrochemical capacitors incorporate a working material in conjunction with a current collector, which is commonly a metal. In contrast, the instant button cell capacitor incorporates two electrochemical capacitors in operative connection providing superior performance.

A nanoporous insulating composite electrode containing TiO$_2$ as the insulating oxide was also prepared. A 3-electrode system was used to determine the capacitance of the TiO$_2$ electrode as well as the SiO$_2$ electrode. The TiO$_2$ electrode had a capacitance of 33 mF/cm$^2$, and the SiO$_2$ electrode had a capacitance of 38 mF/cm$^2$. The TiO$_2$ nanoparticles were prepared by adding concentrated nitric acid to distilled/deionized water in a 0.715:100 volumetric ratio of nitric acid to water. Titania isopropoxide was added to the acidic water in a 8.25:100 volumetric ratio, and the solution was stirred for 72 hours. The sol was then dialyzed.

The SiO$_2$ electrode performed at 2954 W/kg specific power and 9.9 Wh/kg specific energy.

In another example, Distilled and purified water was mixed with concentrated nitric acid (HNO$_3$) and 75% Aluminum Tri-Sec Butoxide (ATSB) in 2-Butanol in a volumetric ratio of 47.1:1:8.8. The solution/suspension was mixed for at least 1 hour, whereby the hydrolysis reaction results in suspended nanoparticles of Al$_2$O$_3$.

We claim:

1. A composite electrode for use in a capacitor comprising:
a conductive member, and,
a sol-gel composite member constructed from a suspension containing insulating oxide particles, wherein the composite member has a median pore diameter in the range 0.1-500 nanometers.

2. The composite electrode of claim 1, wherein the composite member is substantially free of mixed oxidation states of the oxide.

3. The composite electrode of claim 1, wherein the median pore diameter is in the range of 0.3-25 nanometers.

4. The composite electrode of claim 1, wherein the median pore diameter is in the range of 0.3-5 nanometers.

5. The composite electrode of claim 1, wherein the composite member is a layer having an average thickness in the range of 0.01 to 50 μm.

6. The composite electrode of claim 1, wherein the composite member is a layer having an average thickness in the range of 0.1 to 10 μm.

7. The composite electrode of claim 1, wherein the composite member is made from a stable sol-gel suspension comprising insulating oxide particles having a median primary particle diameter in the range of 0.5-500 nanometers, and wherein the insulating atom is a member selected from the group consisting of Be, Mg, Ca, Sr, Ba, Ra, Ti, Zr, Hf, Zn, Cd, Hg, B, Al, Ga, In, Tl, C, Si, Ge, Sn, Pb and combinations thereof.

8. The composite electrode of claim 1, wherein the insulating oxide is a member selected from the group consisting of an alkaline substituted aluminum oxide and an alkaline earth substituted aluminum oxide.

9. The composite electrode of claim 1, wherein the composite member has average surface area in the range of 300-600 m$^2$/g.

10. The composite electrode of claim 1, wherein the conductive member is constructed from carbon, and wherein the surface area of the conductive member is in the range of 1-2000 m$^2$/g.

11. The composite electrode of claim 1, wherein the conductive member is constructed from carbon, and wherein the surface area of the conductive member is in the range of 30-400 m$^2$/g.

12. The composite electrode of claim 1, wherein the insulating oxide is a mixture of MgAl$_2$O$_4$ and Al$_2$O$_3$ at a molar ratio in the range of (0.01-1):1 MgAl$_2$O$_4$:Al$_2$O$_3$, wherein the median primary particle diameter of the MgAl$_2$O$_4$ is in the range of 1-50 nanometers, and wherein the median primary particle diameter of the Al$_2$O$_3$ is in the range of 1-50 nanometers.

13. The composite electrode of claim 12, wherein the median primary particle diameter of MgAl$_2$O$_4$ is in the range of 1-20 nanometers, and wherein the median primary particle diameter of the Al$_2$O$_3$ is 1-20 nanometers.

14. The composite electrode of claim 13, wherein the insulating oxide mixture has a molar ratio in the range of (0.4-1):1 MgAl$_2$O$_4$:Al$_2$O$_3$.

15. The composite electrode of claim 12, wherein the insulating oxide mixture has a molar ratio in the range of (0.4-1):1 MgAl$_2$O$_4$:Al$_2$O$_3$.

16. The composite electrode of claim 1, wherein the insulating oxide is TiO$_2$, and wherein the median primary particle diameter is in the range of 1-50 nanometers.

17. The composite electrode of claim 1, wherein the insulating oxide is $TiO_2$, and wherein the median primary particle diameter is in the range of 1-20 nanometers.

18. The composite electrode of claim 1, wherein the insulating oxide is $SiO_2$, and wherein the median primary particle diameter is in the range of 1-50 nanometers.

19. The composite electrode of claim 1, wherein the insulating oxide is $SiO_2$, and wherein the median primary particle diameter is in the range of 1 to 8 nanometers.

20. The composite electrode of claim 1, wherein the conductive member is porous or nonporous.

21. The composite electrode of claim 1, wherein the conductive member is carbon paper coated with a Au film.

22. The composite electrode of claim 1, wherein the conductive member comprises a member selected from the group consisting of metal-coated carbon, conducting polymer, metal, conducting carbon, and combinations thereof.

23. The composite electrode of claim 1, wherein the conductive member comprises nickel or stainless steel.

24. The composite electrode of claim 1, wherein the composite member is at least 95% free of mixed oxidation states of the oxide.

25. The composite electrode of claim 1, wherein the composite member contains no more than a trace amount of mixed oxidation states of the oxide.

26. A capacitor comprising:
a first composite electrode comprising any one of the composite electrodes of claims 1 to 25,
a second electrode,
an electrolyte-containing solution disposed between the first composite electrode and the second electrode,
a porous member disposed between the first composite electrode and the second electrode, and,
a casing enclosing the first composite electrode, the second electrode, the porous member, and the electrolyte-containing solution.

27. The capacitor of claim 26, wherein the second electrode is independently any one of the composite electrodes of claims 1 to 25.

28. The capacitor of claim 26, wherein the casing is constructed from a member selected from the group consisting of nickel, titanium, aluminum, stainless steel and polymer, and wherein the capacitor is a button cell.

29. The capacitor of claim 26, wherein the first and second insulating oxides are $SiO_2$.

30. The capacitor of claim 26, wherein the electrolyte-containing solution is an aqueous solution comprising electrolytes resulting from compounds selected from the group consisting of $H_3PO_4$, KCl, $NaClO_4$, NaCl, LiCl, $LiNO_3$, $KNO_3$, $NaNO_3$, NaOH, KOH, LiOH, $NH_4OH$, $NH_4Cl$, $NH_4NO_3$, $LiClO_4$, $CaCl_2$, $MgCl_2$, HCl, $HNO_3$, $H_2SO_4$, $KClO_4$, $Na_3PO_4$, $Na_2HPO_4$, $NaH_2PO_4$ and combinations thereof.

31. The capacitor of claim 30, adapted to operate at frequency in the range of 0.01 Hz up to 1000 Hz.

32. The capacitor of claim 26, wherein the electrolyte-containing solution is an organic solution comprising electrolytes resulting from compounds selected from the group consisting of tetraethyl ammonium tetrafluoroborate in propylene carbonate, tetraethyl ammonium tetrafluoroborate in acetonitrile, $LiBF_6$, $LiPF_6$, 1-hexyl-3-methylimidazolium FAP, 1-hexyl-3-methylimidazolium imide, 1-butyl-1-methylpyrrolidinium FAP, 1-butyl-1-methylpyrrolidinium imide, 1-butyl-3-methylimidazolium $PF_6$, butyl-methylpyrrolidinium triflate, 1-butyl-1-methylpyrrolidinium FAP, ethyl-dimethylpropylammonium imide, trihexyl(tetradecyl)phosphonium FAP 1-butyl-1-methylpyrrolidinium BOB, trihexyl (tetradecyl)phosphonium FAP 1-butyl-1-methylpyrrolidinium triflate, 1-hexyl-3-methylimidazolium imide 1-butyl-1-methylpyrrolidinium imide, 1-hexyl-3-methylimidazolium FAP, methyltrioetylammonium trifluoroacetate, N-butyl-4-methylpyridinium $BF_4$, 1-butyl-3-methylimidazolium $BF_4$, 1-butyl-3-methylimidazolium $PF_6$, 1-butyl-3-methylimidazolium triflate, trioctylmethylammonium triflate, 1-butyl-1-methylpyrrolidinium imide, 1-hexyl-3-methylimidazolium FAP, 1-butyl-3-methylimidazolium $BF_4$, 1-butyl-3-methylimidazolium $PF_6$, 1-ethyl-3-methylimidazolium thiocyanate, 1 propyl-3-methylimidazolium iodide, 1-butyl-2,3-dimethylimidazolium iodide, 1,1-dimethylpyrrolidinium iodide, 1,2,3-trimethylimidazolium iodide, 1-butyl-3-methylimidazolium $BF_4$, 1-butyl-3-methylimidazolium $PF_6$, 1-butyl-3-methylimidazolium triflate, 1-butyl-1-methylpyrrolidimium imide, 1-hexyl-3-methylimidazolium FAP, 1-butyl-1-methylpyrrolidinium imide, trihexyl(tetradecyl)phosphonium FAP, trihexyl(tetradecyl) phosphonium BOB, N"-ethyl-N,N,N',N'-tetramethylguanidinium FAP, 1-hexyl-3-methyl imidazolium imide, 1-ethyl-3-methylimidazolium triflate, emim bis(pentafluoroethyl) phosphinate, 1-butyl-3-methylimidazolium methylsulfate, 1-ethyl-3-methylimidazolium $BF_4$, N-butyl-4-methylpyridinium $BF_4$, and combinations thereof.

33. The capacitor of claim 32, adapted to operate at frequency in the range of 0 Hz up to 1 Hz.

34. The capacitor of 26, wherein the porous member is a layer comprising conducting polymer.

35. A method of using the capacitor of claim 26 comprising creating an electrical potential between the electrodes.

36. A method of using any one of the composite electrodes of claims 1-25 comprising:
providing an opposing electrode,
disposing an electrolyte-containing solution and porous member between the composite electrode and the opposing electrode, and,
generating an electrical potential between the electrodes.

37. A method of making any one of the composite electrodes of claims 1-25 comprising:
providing a wettable conductive member,
providing a stable sol-gel suspension comprising insulating oxide having a median primary particle diameter in a range selected from the group consisting of 0.5-500 nm, 1-50 nm, 1-20 nm, and 1-8 nm,
contacting the stable sol-gel suspension to the wettable conductive member, and,
curing the sol-gel suspension producing a sol-gel composite member.

38. The method of claim 37, further comprising:
heating the conductive member at a predetermined temperature and for a predetermined duration producing a conductive member wettable to the sol-gel suspension, and,
sintering the sol-gel composite member and wettable conductive member at a predetermined sintering temperature and for a predetermined sintering duration producing the sol-gel composite member adhered to the surface of the conducting member.

39. The method of claim 38, comprising a plurality of contacting steps and a plurality of sintering steps.

40. The method of claim 38, wherein the insulating oxide is $SiO_2$, wherein the predetermined sintering temperature is 300° C. to 400° C., and wherein the predetermined sintering duration is 3 hours.

41. The method of claim 38, wherein the insulating oxide is a mixture of $MgAl_2O_4$ and $Al_2O_3$ at a molar ratio in the range of (0.01-1):1 $MgAl_2O_4$:$Al_2O_3$, wherein the predetermined sintering temperature is 400° C., and wherein the predetermined sintering duration is 6 hours.

42. The method of claim 41, wherein the molar ratio is in the range of (0.4-1):1 $MgAl_2O_4:Al_2O_3$.

43. The method of claim 38, wherein stable sol-gel suspension is contacted with the wettable conductive member by a process selected from the group consisting of chemical vapor deposition, sputtering, plasma spray, spray coating, spin coating, dip coating, slip casting, imbibing and electrodeposition.

44. The method of claim 43, wherein the stable sol-gel suspension is contacted with the wettable conductive member by dip coating.

45. A stacked cell comprising:
- a plurality of stacked alternating symmetrical composite electrodes each being any one of the composite electrodes of claims 1-25,
- first and second lead wires connected to respective alternating composite electrodes defining a plurality of composite negative electrodes and composite positive electrodes,
- a plurality of porous members each disposed between respective alternating composite negative electrodes and composite positive electrodes,
- electrolyte-containing solution disposed between respective alternating composite electrodes, and,
- an enclosure adapted to enclose and seal the alternating composite electrodes, a portion, of the first and second lead wires, the porous separators and the electrolyte-containing solution.

46. A method of using the stacked cell of claim 45, comprising generating an electrical potential across the first and second lead wires.

47. The composite electrode of claim 1, wherein the insulating oxide is a member selected from the group consisting of $Al_2O_3$, $MgAl_2O_4$, $SiO_2$, $TiO_2$, ZnO, $ZrO_2$ and mixtures thereof.

* * * * *